No. 630,337. Patented Aug. 8, 1899.
J. B. FRENCH.
SIDEWALK OR FLOOR CONSTRUCTION.
(Application filed Jan. 13, 1898.)
(No Model.)

WITNESSES:
Hermann Heinz
Alfred Meltzer

INVENTOR
James B. French
BY
his ATT'Y.

THE NORRIS PETERS CO., PHOTO-LITHO., WASHINGTON, D. C.

UNITED STATES PATENT OFFICE.

JAMES BARRETT FRENCH, OF MAYWOOD, ILLINOIS.

SIDEWALK OR FLOOR CONSTRUCTION.

SPECIFICATION forming part of Letters Patent No. 630,337, dated August 8, 1899.

Application filed January 13, 1898. Serial No. 666,516. (No model.)

*To all whom it may concern:*

Be it known that I, JAMES BARRETT FRENCH, a citizen of the United States of America, and a resident of Maywood, in the county of Cook and State of Illinois, have invented certain new and useful Improvements in Sidewalk or Floor Light Constructions, of which the following is a specification.

My invention relates to sidewalk and floor light constructions. Its principal object is to prevent the crushing of the glass or other transparent or translucent body by the expansion of the concrete or like material which is used as filling around such body. At present this class of sidewalks and floors in common use consist of perforated metallic plates having a glass body over or seated in each perforation and concrete filling between these bodies and in direct contact with same. The expansion of the concrete through moisture and freezing often crushes the glass bodies. This I prevent by using elastic cement in direct contact with the glass or similar body, providing flanges to retain these in the desired position and using the concrete filling around these flanges.

Figure 1:
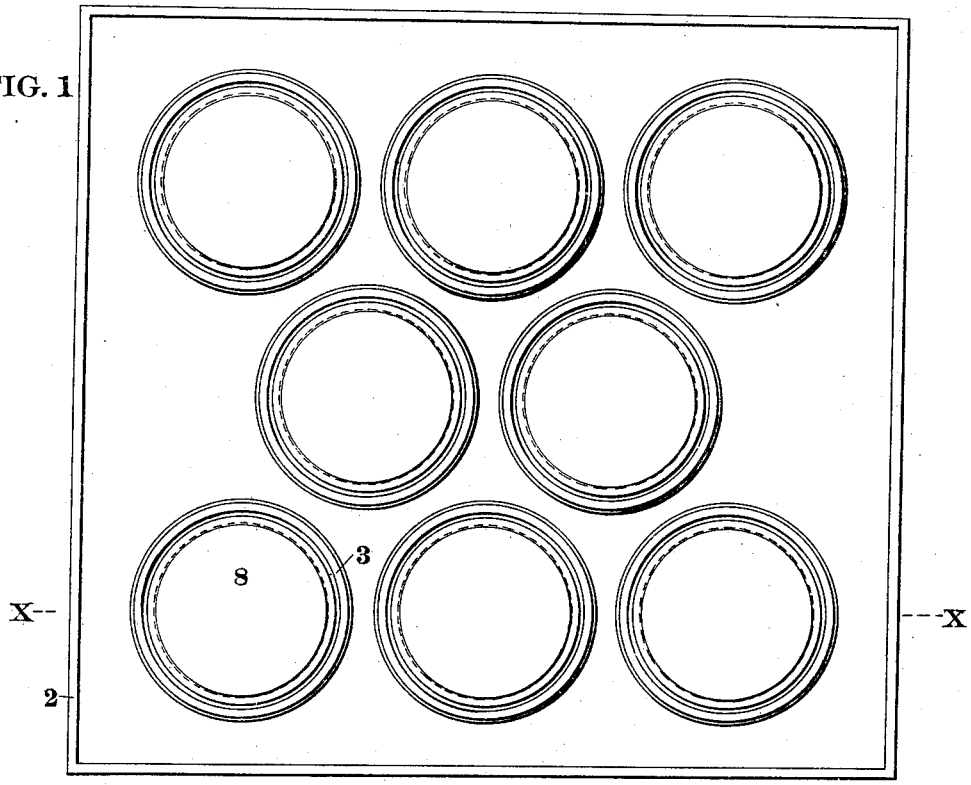
Figure 2:
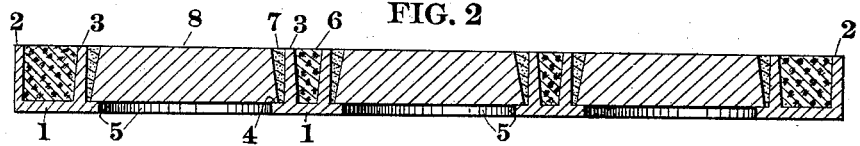
Figure 3:
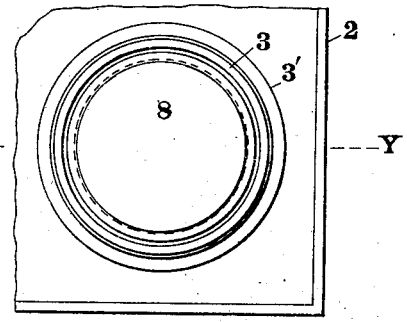
Figure 4:
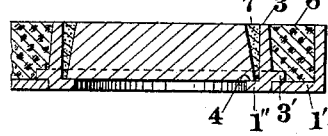

My constructions will be understood from the following description by reference to the accompanying drawings, in which—
Figure 1 is a top plan of a section of sidewalk or flooring constructed according to my invention, the cement 7 and concrete 6 being omitted from this view for the sake of clearness. Fig. 2 is a section of Fig. 1 on the line *x x*, showing the cement and concrete. Fig. 3 is a top plan of part of a modified section of sidewalk or flooring, also omitting the cement and concrete for the sake of clearness. Fig. 4 is a section of Fig. 3 on the line *y y*, showing the cement and concrete.

The form shown in Figs. 1 and 2 consists of a plate 1, preferably of metal, having the perforations 5 therein, a flange 2, surrounding the plate, and a flange 3, surrounding each perforation. The flanges 3 are of slightly-greater inner diameter than the perforations 5, so that a shoulder 4 is provided at the bottom of each flange around the perforation. A transparent or translucent body, preferably of glass, is placed upon this shoulder within each flange 3. Elastic cement 7 is then filled in between the body 8 and the flange 3, surrounding same. Concrete 6 or similar material is then filled in around the flanges 3 in the space outside of the different flanges 3 and inclosed by the flange 2.

The expansion of the concrete through the action of moisture or freezing in my device causes same to press only against the flanges 3, which prevent a direct crushing action upon the bodies 8. Metal rings have been used in direct contact with glass bodies and with concrete surrounding same; but the action of the concrete has been found to be so powerful that these rings have been thereby compressed in places so as to crush the glass. I avoid such crushing effectively by using elastic cement between the glass body and the flanges 3.

In the modified form shown in Figs. 3 and 4 the plate 1' is made with larger perforations and the parts 1" fit into same. The flanges 3 are on the parts 1" and are provided with flanges 3', which hold the parts 1" in the proper position upon the plate 1'. The main difference between this form and that shown in Figs. 1 and 2 is that the cup or casing 1" is made separate from the plate, so that the glass may be cemented into said cup before the latter is attached to the plate and before the concrete filling is added, thus making it possible to prepare these parts at the factory ready for attachment to the plate.

It will be plain that the plates, perforations, flanges, and bodies 8 may be made square, hexagonal, or of any desired shape without departing from the spirit of my invention.

What I claim as my invention, and desire to secure by Letters Patent, is—

A light construction for sidewalks, floors, &c., comprising a perforated bed-plate; a series of lens-casings fitting in said perforations, each having at its lower end an outer shoulder resting on the bed-plate and an inner shoulder for supporting a lens; the lenses in said casings; the cement between each lens and the wall of its casing above the inner shoulder; and the cement or concrete filling between the casings above the outer shoulders.

JAMES BARRETT FRENCH.

Witnesses:
WM. R. RUMMLER,
ALFRED MELTZER.